United States Patent
Hsu et al.

(10) Patent No.: US 6,816,070 B1
(45) Date of Patent: Nov. 9, 2004

(54) METHOD OF GENERATING AN ALERT FOR WALKIE-TALKIE WHEN OUT OF COMMUNICATABLE DISTANCE

(75) Inventors: Jany-Yee Hsu, Tou-Liu (TW); Ming-Hui Chen, Chang-Hua Hsien (TW)

(73) Assignee: Conwise Technology Corporation Ltd., Hsin-Chu (TW)

( * ) Notice: Subject to any disclaimer, the term of this patent is extended or adjusted under 35 U.S.C. 154(b) by 0 days.

(21) Appl. No.: 10/249,587

(22) Filed: Apr. 22, 2003

(51) Int. Cl.[7] ................................................. G08B 1/08
(52) U.S. Cl. ............................. 340/539.21; 340/539.1; 340/539.15; 340/539.23; 340/825.64; 340/825.69; 455/90.2; 455/134; 455/421
(58) Field of Search ...................... 340/539.21, 539.23, 340/825.5, 825.58, 825.64, 825.65, 825.69, 568.2, 539.15, 572.4, 568.1, 539.1, 539.11; 455/9, 67.3, 421, 90.2, 134

(56) References Cited

U.S. PATENT DOCUMENTS

| | | | | |
|---|---|---|---|---|
| 5,533,959 A | * | 7/1996 | Newman et al. | 340/573.1 |
| 5,773,974 A | * | 6/1998 | Kraz | 340/600 |
| 5,796,338 A | * | 8/1998 | Mardirossian | 340/568.1 |
| 6,091,329 A | * | 7/2000 | Newman | 340/539.11 |

\* cited by examiner

Primary Examiner—Davetta W. Goins
(74) Attorney, Agent, or Firm—Winston Hsu

(57) ABSTRACT

A method of generating a warning signal for a walkie-talkie includes: providing a detector and a timer; using the timer to count time; using the detector to determine whether the strength of a radio frequency (RF) signal which includes a standard CTCSS tone received by the walkie-talkie is larger than a predetermined value; using the detector to determine whether the strength of a RF signal which includes a non-standard CTCSS tone received by the walkie-talkie is larger than the predetermined value; if so, resetting the timer; and issuing a warning signal when the time counted by timer reaches a predetermined time.

2 Claims, 6 Drawing Sheets

METHOD OF GENERATING AN ALERT FOR WALKIE-TALKIE WHEN OUT OF COMMUNICATABLE DISTANCE

BACKGROUND OF INVENTION

1. Field of the Invention

The present invention relates to a method of generating an alert for a walkie-talkie, more specifically, a method used in the walkie-talkie for generating a warning signal when the walkie-talkie will be out of communicable distance.

2. Description of the Prior Art

A continuous tone-coded squelch system (CTCSS) has been widely applied to wireless transmission, and is used to let a plurality of users communicate with each other within a predetermined communication area. The CTCSS adopts a low-frequency CTCSS tone signal to distinguish signals transmitted via the same physical channel. For instance, a prior art walkie-talkie utilizes the CTCSS to achieve group communication. Please refer to FIG. 1, which is a schematic diagram showing frequency bands used by the prior art CTCSS. As shown in FIG. 1, a band ranging from 62.5 Hz to 250 Hz is used to transmit the above-mentioned low-frequency CTCSS tone signal, and another band ranging from 300 Hz to 3.4 KHz is used to transmit speech signals spoken by a user. The operation of the CTCSS is described as follows. With regard to the prior art walkie-talkie, 14 channels $P_1$–$P_{14}$ generally are adopted to carry signals, and the 14 channels are physical channels. In addition, 38 CTCSS tone signals $T_1$–$T_{38}$ individually corresponding to different frequencies are used. One of the 38 CTCSS tone signals $T_1$–$T_{38}$ annexed to one physical channel generates a specific logical channel, and the 14 physical channels are capable of forming 532 (14*38) logical channels in total. When a speaker sets the walkie-talkie with a physical channel $P_1$ and a desired CTCSS tone signal $T_1$, that is, the logical channel set by the speaker becomes $P_1$ ($T_1$). After the speaker presses a push-to-talk (PTT) button on the walkie-talkie, the speaker is capable of outputting speech signals via the walkie-talkie toward the predetermined communication area specified by the walkie-talkie. If there are three listeners in the predetermined communication area, and the three listener set their own logical channels as $P_1$ ($T_1$), $P_1$ ($T_{38}$), $P_2$ ($T_1$) respectively. For the first listener with a logical channel $P_1$ ($T_1$), because his walkie-talkie receives and transmits signals through the physical channel $P_1$, the walkie-talkie of the first listener will start receiving speech signals spoken by the speaker. In addition, the walkie-talkie of the first listener judges that the CTCSS tone signal used by the speaker is $T_1$. In other words, the speaker and the first listener both adopt the same logical channel $P_1$ ($T_1$). Therefore, the walkie-talkie of the first listener then outputs the received speech signals via an audio speaker. The first listener is capable of hearing the speech signals spoken by the speaker. For the second listener with a logical channel $P_1$ ($T_{38}$), because his walkie-talkie receives and transmits signals through the physical channel $P_1$, the walkie-talkie of the second listener will start receiving speech signals spoken by the speaker. However, the walkie-talkie of the second listener judges that the CTCSS tone signal used by the speaker is not $T_1$, but $T_{38}$. In other words, the speaker and the second listener adopt different logical channels $P_1$ ($T_1$) and $P_1$ ($T_{38}$). Therefore, the walkie-talkie of the second listener then does not output the received speech signals via an audio speaker. The second listener cannot hear the speech signals spoken by the speaker. For the third listener with a logical channel $P_2$ ($T_1$), because his walkie-talkie receives and transmits signals through the physical channel $P_2$, the walkie-talkie of the third listener and that of the speaker use different physical channels. With the unmatched physical channel, the walkie-talkie of the third listener cannot acknowledge an adequate signal strength indicated by a received signal strength indicator (RSSI). Therefore, the walkie-talkie of the third listener will not receive any speech signals spoken by the speaker. That is, no speech signal is played by an audio speaker of the walkie-talkie. The second and third listeners cannot hear any speech signals spoken by the speaker, that is, the walkie-talkies of the second and third listeners both detect the CTCSS tone signal related to the received speech signals for actuating a signal squelch function. To sum up, only the users using the same logical channel can communicate with each other to achieve group communication.

Please refer to FIG. 2, which is a block diagram of a prior art walkie-talkie 10. The walkie-talkie 10 has an antenna 11, a transceiver 12, a selector 14, a processor 16, a speaker 17, a microphone 18, and a speech signal processor 20. The walkie-talkie 10 can receive and transmit radio frequency (RF) signals through the antenna 11. With regard to receiving RF signals, the transceiver 12 converts the high-frequency RF signal into a low-frequency baseband signal Rx, and transmits the baseband signal Rx to the selector 14. The selector 14 then outputs the baseband signal Rx from an output port A. The processor 16 determines frequency of a CTCSS tone signal according to the received baseband signal Rx. Generally speaking, the processor 16 has a low-pass filter (LPF) for extracting signals with frequencies ranging from 62.5 Hz to 250 Hz, and then the processor 16 judges the CTCSS tone signal related to the baseband signal Rx to decide whether the walkie-talkie 10 and the baseband signal Rx use the same logical channel. If the walkie-talkie 10 and the baseband signal Rx use the same logical channel, the processor 16 activates the speaker 17 to proceed following signal output operation. That is, the speech signal processor 20 has two analog filter circuits for extracting signals with frequencies ranging from 300 Hz to 3.4 KHz, and the extracted signals are played by the speaker 17. On the contrary, if the walkie-talkie 10 and the baseband signal Rx use different logical channels, the processor 16 does not actuate the speech signal processor 20 and the speaker 17. The walkie-talkie 10, therefore, does not output any speech signals transmitted by unmatched logical channels. With regard to transmitting RF signals, when the user presses the PTT button, the selector 14 will chose the input port B, and the processor 16 simultaneously actuates the microphone 18. Therefore, the speech signals spoken by the user are inputted into the speech signal processor 20. As mentioned above, the speech signal processor 20 uses filter circuits to extract signals with frequencies ranging from 300 Hz to 3.4 KHz, and the speech signal processor 20 outputs the extracted signals to the CTCSS encoder 18. Based on a CTCSS code (CTCSS tone signal with a specific frequency) set in the walkie-talkie 10, the processor 16 adds a corresponding CTCSS tone signal in the extracted signals outputted from the speech signal processor 20 for forming a baseband signal Tx. In the end, the transceiver 12 converts the low-frequency baseband signal Tx into a high-frequency RF signal, and the RF signal is then outputted via the antenna 11.

Generally speaking, because the radio signal easily is obstructed by obstacles, such as trees, thick leaf and building, or particle, such as steam and dust, which can limit the conversationscope for the walkie-talkie. As for the user, although the common walkie talkies are given a recommend conversation scope, but these scopes are estimation values.

Under different environments, in fact, the really conversation scopes are not fixed, meaning that the user cannot know the real conversation scopes with each other. Therefore, unconsciously, a bad communication quality is caused by terrain and environmental factor.

SUMMARY OF INVENTION

It is therefore a primary objective of the claimed invention to provide a method used in a walkie-talkie for generating a warning signal while leaving a conversation distance to solve the aforementioned problem.

Briefly summarized, the claimed invention provides a method for a walkie-talkie comprising providing a detector and a timer; using the timer to count time; using the detector to determine whether the strength of a radio frequency (RF) signal which includes a standard CTCSS tone received by the walkie-talkie is larger than a predetermined value; using the detector to determine whether the strength of a RF signal which includes a non-standard CTCSS tone received by the walkie-talkie is larger than the predetermined value; if so, resetting the timer; and issuing a warning signal when the time counted by timer reaches a predetermined time.

These and other objectives of the claimed invention will no doubt become obvious to those of ordinary skill in the art after reading the following detailed description of the invention, which is illustrated in the various figures and drawings.

DETAILED DESCRIPTION

Figure 1:
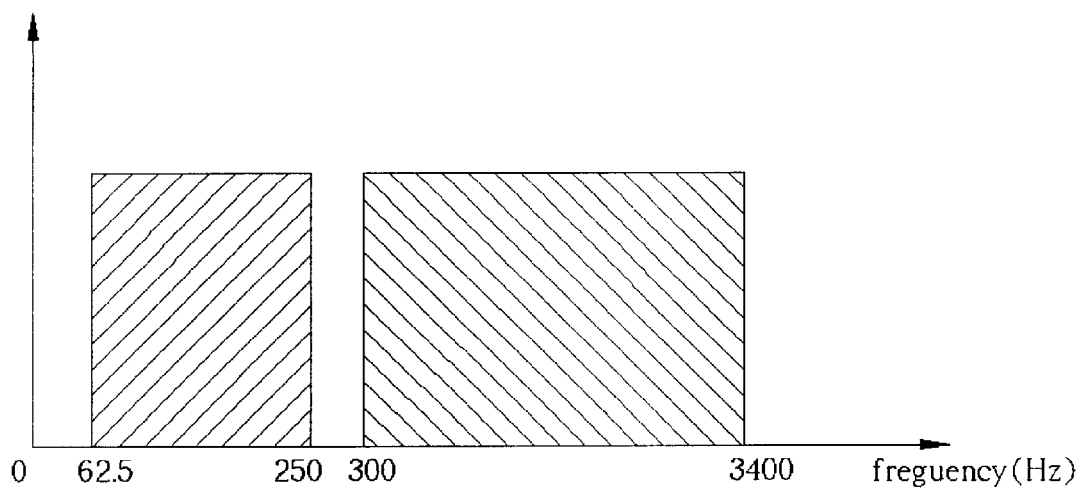
FIG. 1 is a schematic diagram showing frequency bands used by the prior art CTCSS.
Figure 2:
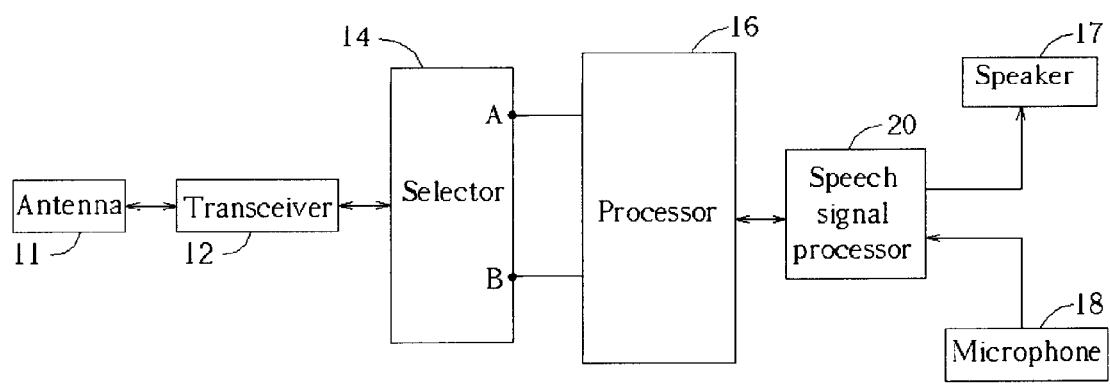
FIG. 2 is a block diagram of a prior art walkie-talkie.
Figure 3:
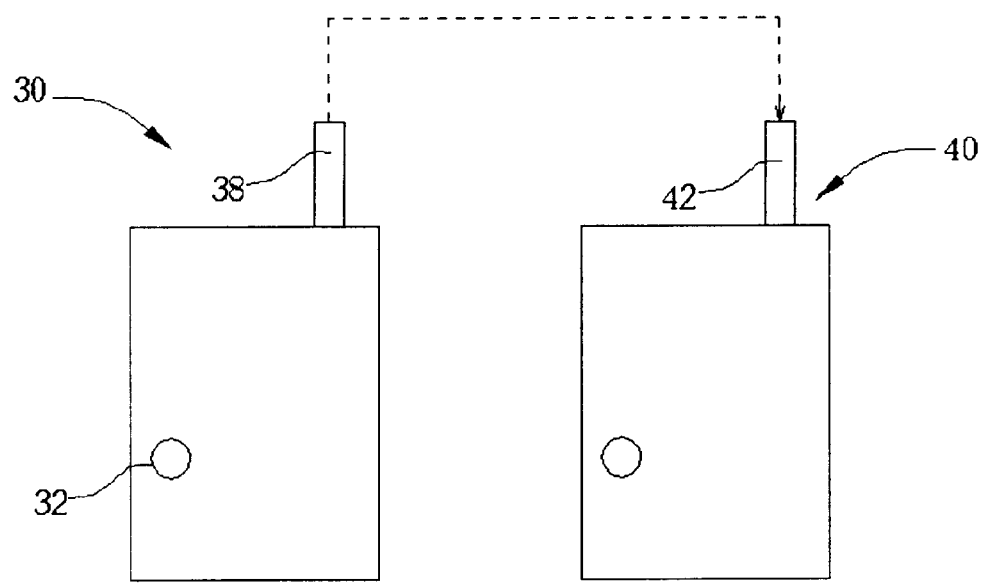
FIG. 3 is a schematic diagram of the walkie-talkies according to the present invention.
Figure 4:
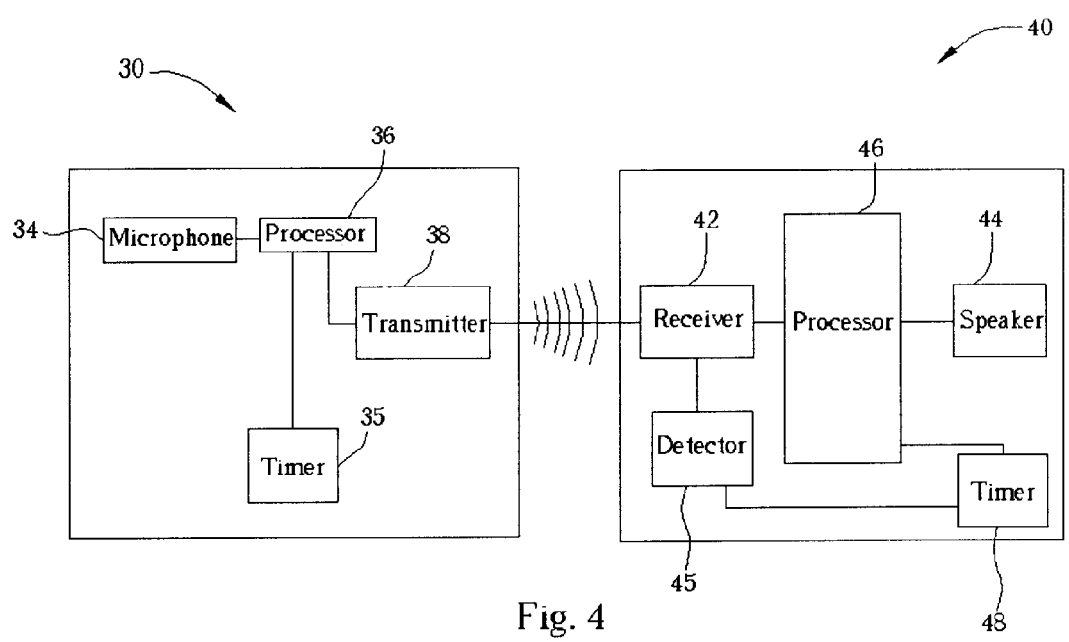
FIG. 4 is a block diagram of the walkie-talkies according to the present invention.
Figure 5:
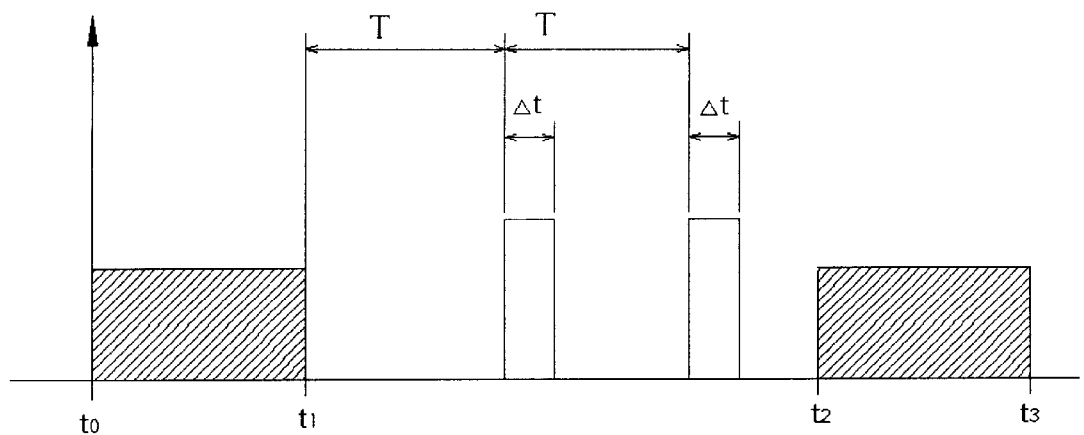
FIG. 5 is a timing diagram at transmission end depicted in FIG. 4.

Please refer to FIGS. 3, 4, and 5. FIG. 3 is a schematic diagram of the walkie-talkies 30, 40 according to the present invention. FIG. 4 is a block diagram of the walkie-talkies 30, 40 according to the present invention. FIG. 5 is a timing diagram at transmission end depicted in FIG. 4. The walkie-talkie 30 comprises a push-to-talk (PTT) button 32, a microphone 34, a timer 35, a processor 36, and a transmitter 38. The walkie-talkie 40 comprises a receiver 42, a speaker 44, a detector 45, a processor 46, and a timer 48. When pressing the PTT button 32 (time at $t_0$–$t_1$ and $t_2$–$t_3$ shown in FIG. 5), the processor 36 activates the microphone 34 to receive a speech signal, which is converted from human sound or ambient sound, and generates a standard CTCSS tone signal according to a predetermined frequency. Finally, the speech signal and the standard CTCSS tone signal both combining a predetermined carrier is broadcasted. For example, as shown in FIG. 1, since 38 channels corresponding to the standard CTCSS tone signals are distributed in the frequency range of 62.5 Hz–250 Hz, if a user sets his walkie-talkie under a logical channel $P_1$ ($T_{38}$), i.e. using a physical channel $P_1$ carrier, and a 38 standard CTCSS tone signal (given its frequency is 250 Hz), the speech signal is broadcasted by using the logical channel $P_1$ ($T_{38}$). After releasing the PTT button 32, the timer 35 counts until reaching a predetermined time T or until the PTT button 32 is repressed again, and then the timer 32 is reset. The processor 36 outputs a non-standard CTCSS tone signal for a time $\Delta t$ whose frequency range is between 62.5 Hz–250 Hz but not overlapping the frequency range used by the standard CTCSS tone, when the time counted by the timer 35 reaches a predetermined time T. Since the standard CTCSS tone signal and the non-standard CTCSS tone signal belong to the same frequency range, for preventing error, while the standard CTCSS tone signal is being transmitted, the non-standard CTCSS tone signal fails to be transmitted. For the following explanation, assume that the non-standard CTCSS tone signal is defined as 65 Hz and is not used by any standard CTCSS tone signal.

The transmitter 42 of the walkie-talkie 40 is used for receiving the RF signal from the walkie-talkie 30. In the preferred embodiment, supposed that the transmitter 42 is set in advance for receiving the carrier of the physical channel $P_1$, the detector 45 is used for determining whether the RF signal received by the transmitter 42 consists of the non-standard CTCSS tone signal. The processor 46 is used for extracting the speech signal within the RF signal. The speaker 44 is used to transform the speech signal into sound waves and to output the sound waves. The timer 48 is used to count time. In FIG. 5, the timer 48 starts to count when the walkie-talkie 40 turns on at the time $t_0$.

Figure 6:
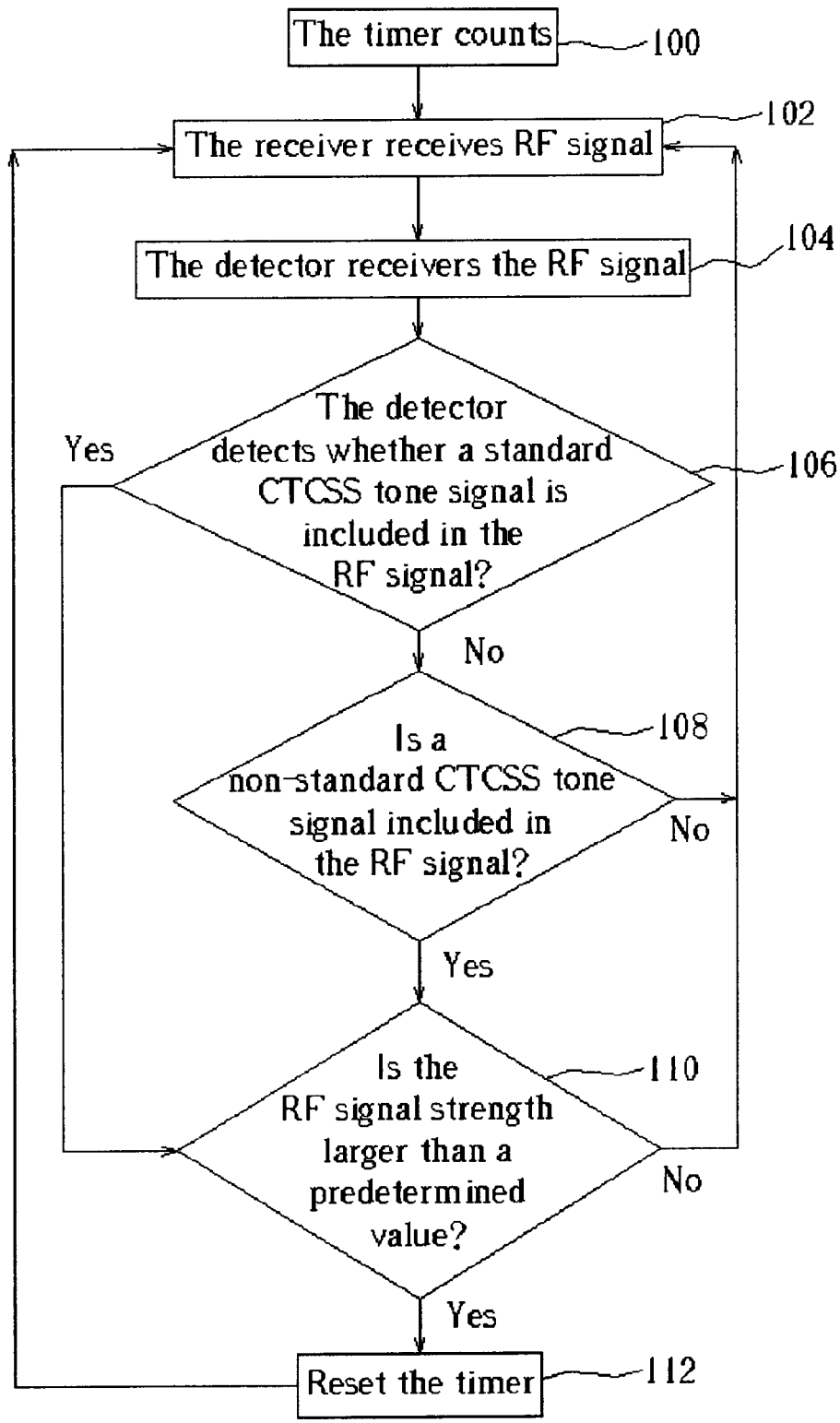
FIG. 6 is an operation flowchart with respect to the walkie-talkie according to the present invention.

Please refer to FIG. 6 illustrating an operation flowchart with respect to the walkie-talkie 40. The operation of the walkie-talkie 40 is as follows:

Step 100: the timer 48 counts;

Step 102: the receiver 42 receives the RF signal;

Step 104: the detector 45 receives the RF signal;

Step 106: the detector 45 detects whether a standard CTCSS tone signal is included within the RF signal; if it is, go to step 110, if not, go to step 108;

Step 108: the detector 45 detects whether a non-standard CTCSS tone signal is included within the RF signal; if it is, go to step 110, if not, go to step 102;

Step 110: the detector 45 detects whether either the non-standard CTCSS tone signal strength or the standard CTCSS tone signal strength is larger than a predetermined value; if it is, go to step 112, if not, go to step 102;

Step 112: reset the timer 48.

After activating the walkie-talkie 40, the timer 48 counts (step 100). The receiver 42 receives the RF signal with the carrier using the physical channel P1 and eliminates that with the carrier using the other physical channels. After receiving the RF signal, the detector 45 will detect whether the standard CTCSS tone signal with 250 Hz is included within the RF signal (step 106). If it is, this represents the PTT button 32 of the walkie-talkie 30 is pressed, and at this moment, the detector 45 will determine whether the standard CTCSS tone signal strength is larger than a predetermined value (step 110). If the standard CTCSS tone signal with 250 Hz is not included within the RF signal, this means the PTT button 32 is released, the detector 45 will detect whether the non-standard CTCSS tone signal with 65 Hz is included within the RF signal (step 108). When detecting the RF signal consisting of the non-standard CTCSS tone signal with 65 Hz, the detector 45 will compare the RF signal strength with a predetermined value (step 110). If the RF signal strength is larger than the predetermined value, this means the user using the walkie-talkie 40 is still in a receivable distance from another user using the walkie-talkie 30; if not, this means the desired RF signal strength is close to the threshold (i.e. RSSI depicted above), representing that the RF signal from the walkie-talkie 30 is on the verge of being received by the walkie-talkie 40. Notice that the predetermined value must be larger than the threshold for the receivable signal strength, so, if the signal strength is between the predetermined value and the threshold, the user using the walkie-talkie 40 still listen to voice from the walkie-talkie 30. If the timer 48 is not reset by above-mentioned reason, when the time reaches a predetermined time (2T for example), the walkie-talkie 40 will output a warning signal so as to notify the user that a communicable distance between the walkie-talkie 30 and the walkie-talkie 40 is close to the threshold. At this time, the user should finish the conversation or shorten the conversation distance, preventing sudden communication termination or bad communication quality. After issuing the warning signal, the timer 48 is reset, and the walkie-talkie 40 repeats above procedures until being turned off.

In contrast to the prior art, the present invention walkie-talkie sends a non-standard CTCSS tone signal regularly when the walkie-talkie is in standby mode. In this way, no matter the walkie-talkie is in standby mode or is operating, by detecting the RF signal consisting of the non-standard CTCSS tone signal strength in standby and detecting the RF signal consisting of the standard CTCSS tone signal strength while operating, the walkie-talkie is capable of timely alarming the user to take care of conversation distance, regardless of location wherever the user is. When receiving a warning signal, the user has sufficient time to finish the conversation or to shorten the conversation distance, preventing sudden communication termination or bad communication quality.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method of generating a warning signal for a walkie-talkie comprising:

providing a detector and a timer in the walkie-talkie;

using the timer to count;

when receiving a radio frequency (RF) signal which consists of a standard continuous tone-coded squelch system (CTCSS) tone, using the detector to determine whether a strength of the radio frequency signal consisting of the standard CTCSS tone is larger than a predetermined value;

when receiving a radio frequency (RF) signal which consists of a non-standard CTCSS tone, using the detector to determine whether a strength of the radio frequency signal consisting of the non-standard CTCSS tone is larger than the predetermined value;

resetting the timer when strength of the RF signal consisting of the non-standard CTCSS tone is larger than the predetermined value;

resetting the timer when strength of the RF signal consisting of the standard CTCSS tone is larger than the predetermined value; and issuing a warning signal when the time counted by timer reaches a predetermined time.

2. The method of claim 1 wherein the predetermined value is larger than a minimum receivable threshold.

* * * * *